United States Patent
Conrad et al.

(10) Patent No.: US 9,207,961 B2
(45) Date of Patent: Dec. 8, 2015

(54) CLOUD DEFRAGMENTATION

(71) Applicants: Jeffrey Keating Conrad, San Antonio, TX (US); Gregory Scott Kirkland, Austin, TX (US)

(72) Inventors: Jeffrey Keating Conrad, San Antonio, TX (US); Gregory Scott Kirkland, Austin, TX (US)

(73) Assignee: Rackspace US, Inc., San Antonio, CA (US)

( * ) Notice: Subject to any disclaimer, the term of this patent is extended or adjusted under 35 U.S.C. 154(b) by 72 days.

(21) Appl. No.: 13/798,568

(22) Filed: Mar. 13, 2013

(65) Prior Publication Data

US 2013/0318526 A1  Nov. 28, 2013

Related U.S. Application Data

(60) Provisional application No. 61/651,684, filed on May 25, 2012.

(51) Int. Cl.
*G06F 9/455* (2006.01)

(52) U.S. Cl.
CPC ........ *G06F 9/45533* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,925,850 B1* | 4/2011 | Waldspurger et al. | 711/162 |
| 2009/0199177 A1* | 8/2009 | Edwards et al. | 718/1 |
| 2010/0020806 A1 | 1/2010 | Vahdat et al. | |
| 2010/0287263 A1 | 11/2010 | Liu | |
| 2010/0332658 A1* | 12/2010 | Elyashev | 709/226 |
| 2011/0004680 A1* | 1/2011 | Ryman | 709/224 |
| 2011/0055377 A1 | 3/2011 | Deehan | |
| 2012/0054731 A1 | 3/2012 | Aravamudan | |
| 2012/0167080 A1* | 6/2012 | Vilayannur et al. | 718/1 |
| 2012/0222106 A1 | 8/2012 | Kuehl | |
| 2012/0254864 A1* | 10/2012 | Bork et al. | 718/1 |
| 2014/0115584 A1* | 4/2014 | Mudigonda et al. | 718/1 |

OTHER PUBLICATIONS

U.S. Appl. No. 13/352,852, filed Jan. 18, 2012, entitled, "Optimization Allocation of On-Demand Resources Using Performance Zones," by Erik V. Carlin, et al.

* cited by examiner

*Primary Examiner* — Sisley Kim
(74) *Attorney, Agent, or Firm* — Trop, Pruner & Hu, P.C.

(57) ABSTRACT

In an embodiment, a method includes identifying, in a defragmentation scheduling logic of a first system of a data center, a first virtual machine (VM) of a first server of the data center to select for migration based on a cost determined according to a source algorithm, identifying a second server of the data center to select for receipt of the first VM based on a cost determined according to a destination algorithm, where the second server has available free space to receive the first VM and the available free space has been scrubbed prior to the identification, and migrating a substantial plurality of VMs between servers of the data center based on cost according to the source and destination algorithms, to defragment the data center.

9 Claims, 3 Drawing Sheets

CLOUD DEFRAGMENTATION

This application claims priority to U.S. Provisional Patent Application No. 61/651,684, filed on May 25, 2012 entitled "Cloud Defragmentation," the disclosure of which is hereby incorporated by reference.

BACKGROUND

A multi-tenant data center provides resources that can be accessed by different customers of an infrastructure provider that provides the data center. Many different types of resources can exist in the data center, including server resources, storage resources, load balancer resources and so forth.

Many of these resources can be provided in a virtualized manner such that different instances on a single physical resource each can be allocated to one or more customers. As the allocation of a given resource increases to a fully utilized level, some amounts of unused resource capacity may become stranded, as there may not be sufficient resource to provide for additional virtualized instances, or to allow for expansion of already allocated virtualized instances.

DETAILED DESCRIPTION

Figure 1:
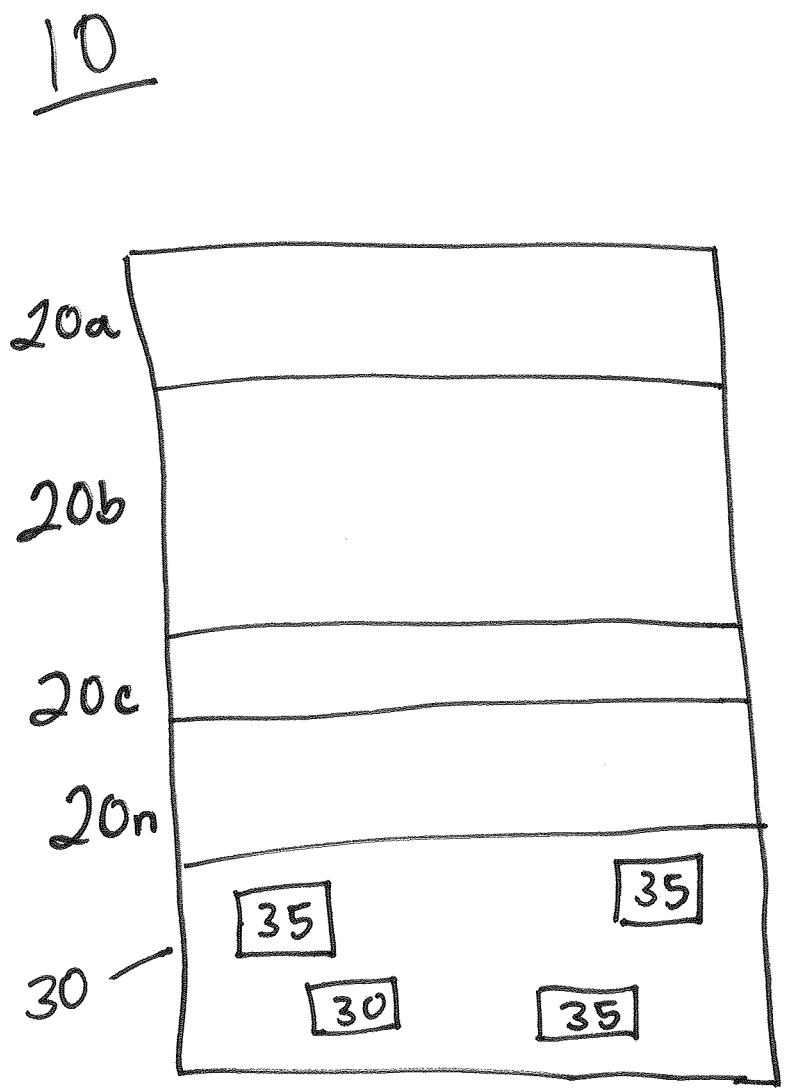
FIG. 1 is a block diagram of a server in accordance with an embodiment.

In various embodiments, a cloud-based multi-tenant data center can have various resources defragmented to enable more efficient use of the resources. To this end, embodiments provide source and destination algorithms to identify virtual resources such as virtual machines (VMs), to thus identify VMs for migration from a first physical server to a second physical server. Note that the terms "server", "host," and "host machine" are used interchangeably herein to refer to a physical server system.

Note that embodiments provide for a mass defragmentation of data center resources such that VMs and/or other virtualized instances can be migrated at high scale from source to destination resources in a rapid, configurable, and flexible manner to thus enable better usage of the data center resources.

Embodiments described herein relate to a defragmentation in which VMs are migrated from source to destination server resources according to the source and destination algorithms at high speeds to thus obtain a defragmented data center arrangement in which the same amount of physical resources present before the migration can have greater available contiguous space for additional virtualized instances at a conclusion of the migration.

As to the scale of the defragmentation, embodiments can handle migrations involving tens of thousands of customers and hundreds of thousands of VMs in a relatively small time frame, e.g., within a few weeks, all the while maintaining the resources accessible to customers during the defragmentation process. As an example, more than 70,000 VMs can be migrated in the course of several weeks.

Furthermore, embodiments may provide also for upgrading of certain hypervisors that act as an orchestration layer for multiple VMs. For example, hypervisors may be updated from a Citrix Open Source Xen hypervisor (referred to herein as "XenClassic") to a Citrix XenServer (referred to herein as "XenServer") hypervisor to improve performance. The different hypervisor implementations may also be taken into account in cost mechanisms of the source and destination algorithms.

Both the source and destination algorithms may provide a mechanism to determine a cost to identify appropriate source servers and destination servers for a given transfer. Also, note that the source and destination algorithms are interdependent on each other. That is, based on a need to relocate a VM of a given size (according to the source algorithm), the destination algorithm may make certain decisions. And similarly, the source algorithm may make certain decisions as to VM movement based on available space according to the destination algorithm. In some embodiments, a modified server best match algorithm can be used to find an appropriate destination host machine. Furthermore, the algorithm can be controlled with a goal to fill up used servers as much as possible, but not if a "dirty" (as defined below) VM remains on the server.

In addition, embodiments also provide security mechanisms to ensure that random fragments of data of a customer still present on an original server cannot be accessed by a new customer that has a VM placed on that original server resource so that any random data of the first customer that was left behind cannot be accessed.

Thus, the defragmentation can involve security considerations to avoid the above concern of potentially allowing access to random fragments of a customer's data maintained on an original physical disk. To this end, the defragmentation generally provides for first scrubbing free space in all host machines, migrating potentially "dirty" space from a first host machine to a free space in a second host machine, and then scrubbing the vacated space in the first host machine.

Referring now to FIG. 1, shown is a block diagram of a host server resource 10 that includes multiple VMs $20_a$-$20_n$. As seen, some of these VMs can be of different sizes (e.g., with respect to memory, storage resources or so forth). In addition, server 10 also includes a free space portion 30 that may be available for handling additional VMs. However, as seen in FIG. 1, this free space includes some amount of data fragments 35, which may have been left behind by a previous customer that had a VM running on the server where this VM was terminated or migrated.

As such, prior to performing any defragmentation using this host server, a scrubbing operation may first be performed on this free space, thus removing any potential data fragments that are left behind. Then, this host server can be used as an appropriate destination server for receiving VMs during the data center defragmentation.

Figure 2:
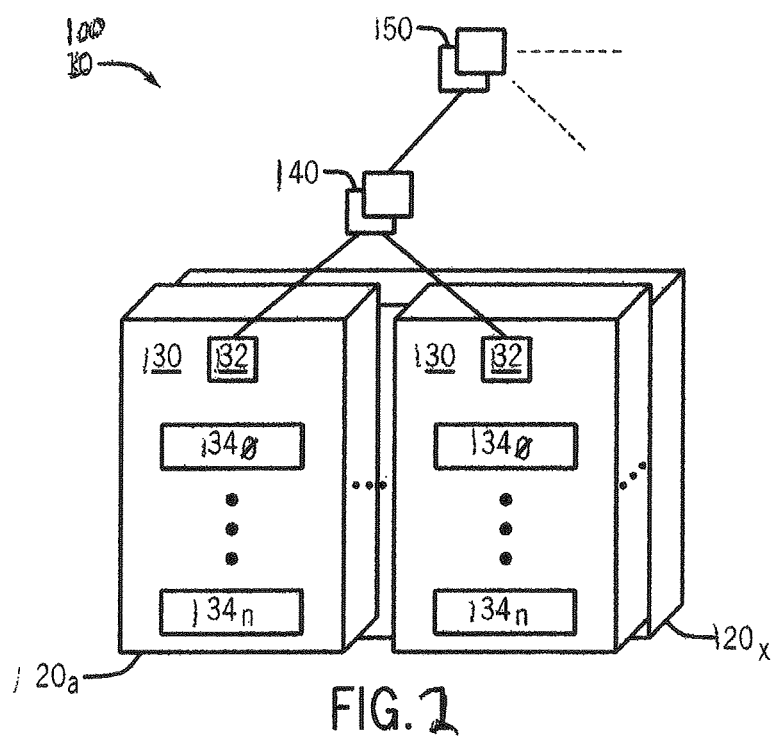
FIG. 2 is a physical view of a portion of a data center in accordance with one embodiment of the present invention.

Referring now to FIG. 2, shown is a physical view of a portion of a data center. In a physical sense, a data center such as the multi-tenant data center portion of FIG. 2 includes many different types of computing resources, storage resources, switching resources, networking resources and so forth. However, for purposes of discussion and illustration herein, the view of FIG. 2 is limited to compute resources, namely a plurality of servers 134 (generally). In the illustration of FIG. 2, individual servers $134_0$-$134_n$ can be configured in a cabinet 130. To provide for communications between servers within this cabinet, as well as for communications with outside entities with respect to this cabinet, a switch and/or router 132 may be present. In general, servers 134 can be configured as rack-based servers and may take various forms, including blade-type servers, rack-mounted servers, chassis-enclosed servers and so forth. Each server may generally include at least a processor, memory, network interface circuitry, and mass storage. Each of these physical servers may accommodate multiple VMs, with each VM associated with one customer of the data center.

A collection of servers present in multiple cabinets can form a huddle 120, which corresponds to a collection of physical servers present in one or more cabinets within the data center that share a substantially homogenous configuration of network, compute, and management capabilities. As an example, a huddle may be formed of servers present in a given number of cabinets. For example, a huddle can be formed of servers present within 10 cabinets. Assume for purposes of example that each cabinet can be configured with 20 servers. Accordingly, a huddle can include a collection of 200 servers in this example.

As further seen in FIG. 2, multiple huddles $120_a$-$120_x$ may be present in an access layer. In turn, each of the huddles can communicate upstream to an aggregation layer that can include multiple switches 140. Thus, communication between different cabinets within huddles of an access layer can occur using switches 140 (and in-cabinet switch 132). In turn, communications with agents outside of this set of huddles can occur via an upstream connection through a core layer, which may include a plurality of switches 150. Of course, although not shown for ease of illustration in FIG. 2, understand that multiple switches of the core layer can be interconnected together, and furthermore multiple switches of the aggregation layer can communicate with a single switch of the core layer. There can be different levels of latency and network capacity at a number of predetermined points. For example, different latencies and capacity can exist with reference to traffic within a huddle, contained to one cabinet; traffic within a huddle traversing between two separate cabinets (same aggregation device); traffic between huddles traversing between two separate cabinets (same aggregation device); traffic between huddles traversing between two separate cabinets, each cabinet connected to a different aggregation point; and traffic between huddles located in different data centers.

Migrations can be triggered by various agents. For example, an operations group of the data center may trigger a migration, a reboot of a VM may trigger a migration, or a customer may initiate a migration.

Various tables may be used by defragmentation scheduling logic to select appropriate candidates for migration. For example, a migratable image list is provided to include a list of images that can be moved to a updated hypervisor (e.g., XenServer), and a reboot triggered move list may include all VMs that are associated with a legacy hypervisor (e.g., Xen Classic). This list may include a moved indicator in each entry to identify whether the given VM has been already migrated to a clean location. In addition, an enabled indicator of each entry indicates whether the VM is enabled for a customer reboot triggered move.

For a customer triggered move, a customer issues a reboot request. If this VM is not enabled for a reboot trigger move (as determined by the enabled indicator), a normal reboot is performed. If instead the VM is already moved to a clean host, as indicated by the moved indicator, a normal reboot occurs.

Otherwise if a move is indicated, a migration to an updated hypervisor may occur if the image for the VM is in a list of migratable images, there is capacity for this VM in a given location of the data center (e.g., within the same huddle). Otherwise if one or more of these criteria are not met, a migration to a host that includes the same type of hypervisor (e.g., a legacy hypervisor) is effected. Similar mechanisms may be used to perform migrations for reboot and operations-triggered migrations.

In an embodiment, costs may take into account factors to ensure that a Linux™ migration is destined to a XenServer host (e.g., version 5.6) for huddles that include both Windows™ and Linux™ builds. In addition, costs may be set to favor a XenServer host (e.g., version 5.5) for Windows™ builds. In addition, a higher cost is allocated to a host that includes unscrubbed customer data to ensure only clean host machines are selected to defragment the huddles.

In addition, a cost value when selecting a destination server may include memory allocations for servers that were migrated to a new host and those that are still migrating to a new server so that multiple VMs do not all try to select the same host, and instead may be distributed more evenly across multiple host machines.

Note also that when moving a VM from XenClassic to XenServer, multiple migrations may be allowed to occur on the same host and activate additional XenServer hosts to provide for XenClassic to XenServer migrations.

Migrations as described herein can be performed to move instances within the same cabinet, within the same huddle, within the same data center, or even among different data centers depending on the analysis of the source and destination algorithms.

Figure 3:
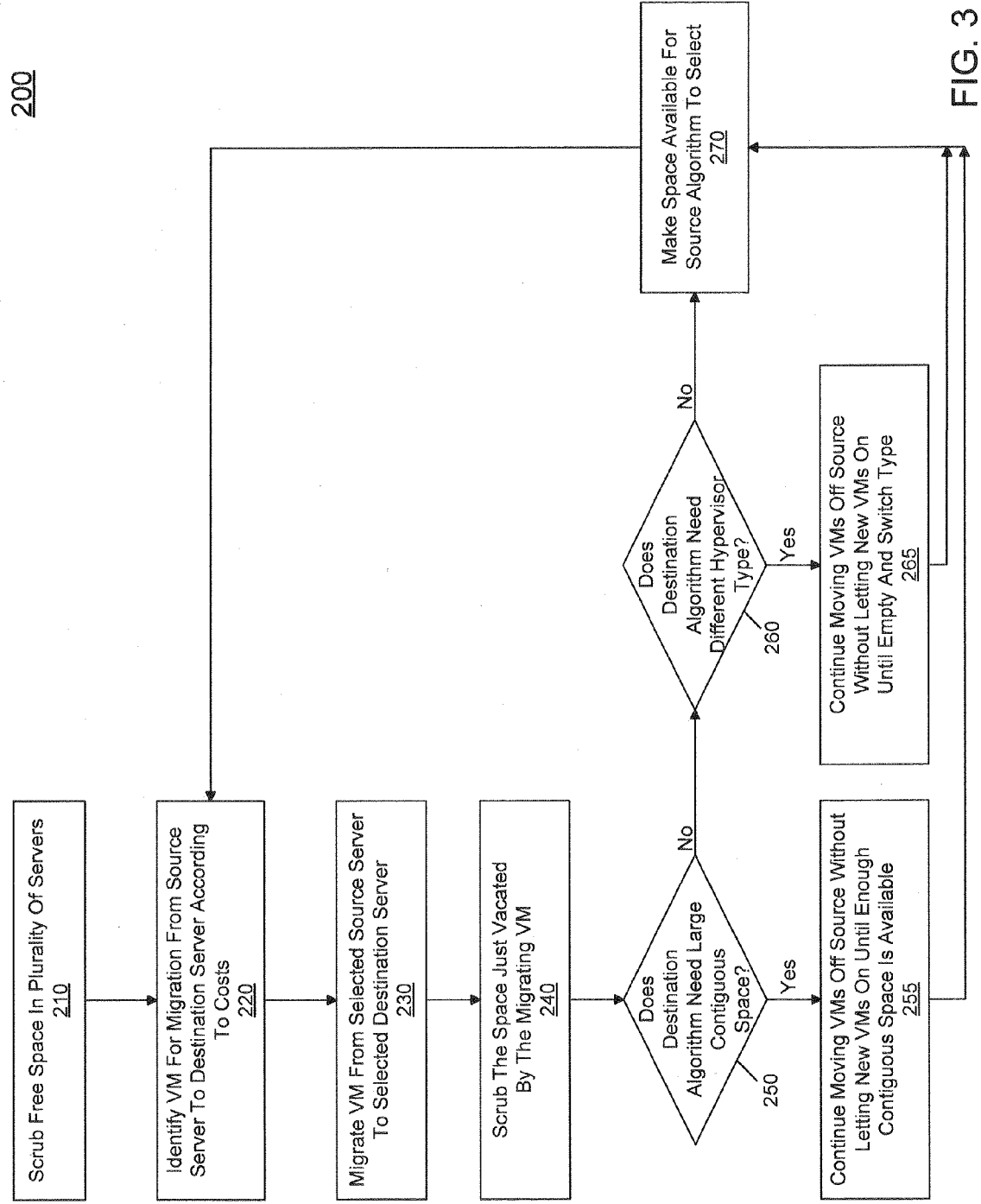
FIG. 3 is a flow diagram of a method for performing a data center defragmentation in accordance with an embodiment of the present invention.

Referring now to FIG. 3, shown is a flow diagram of a method for performing a data center defragmentation in accordance with an embodiment of the present invention. As shown in FIG. 3, method 200 begins by scrubbing free space in a plurality of servers (block 210). For example, prior to beginning the data center defragmentation, all possible servers to be used as destination servers can have any free space thereon scrubbed. Various well-known scrubbing techniques can be used to thus ensure that the free space does not have any random fragments of prior customers' data.

Next, control passes to block 220 where a VM is identified for migration from a source server to a destination server. In an embodiment, this identification may be according to costs determined according to a source algorithm and a destination algorithm. Next, control passes to block 230 where the selected VM is migrated accordingly.

As further seen in FIG. 3, control next passes to block 240 where space that was just vacated by the migrated VM is scrubbed. Next, control passes to diamond 250 to determine whether a large contiguous space is needed. More specifically, the destination algorithm may make this determination, e.g., responsive to presence of one or more VMs to be migrated of a size that exceeds a given threshold.

If such a large space is needed, control passes to block 255 where the VMs of the current source server may continue to be migrated. More specifically as seen at block 255 such migration may continue without allowing any new VMs to be installed on this source server until an appropriate level of contiguous space is available. Thus this operation demonstrates the interdependency between the source and destination algorithms, since in light of a need for available space of a given size as indicated by the destination algorithm, the source algorithm continues to select VMs for migration from this source server.

Still referring to FIG. 3, if instead the determination at diamond 250 is in the negative, control passes to diamond 260 where the destination algorithm can determine whether these is a need for a different hypervisor type. This different hypervisor type may correspond to an updated hypervisor, in an embodiment. If this determination is in the negative, control passes to block 270, where the available space that has been scrubbed is made available to the source algorithm for selection.

Otherwise, if at diamond 260 it is determined that a different hypervisor type is needed, control passes to block 265 where VMs may continue to be moved off this source server without allowing new VMs to be installed. When this server is empty, a so-called kick operation may occur to update the physical server to execute using an updated or otherwise different hypervisor. After completion of this update, control passes to block 270, discussed above. From block 270, control then continues back to block 220 for selection of an additional VM for migration. Note that the operations of FIG. 2 may continue until the entire data center is defragmented. In different implementations, various components of the data center may be involved in method 200 and can be implemented in hardware, software and/or firmware of one or more systems of the data center, such as backend data center management system including a defragmentation scheduling logic as implemented in one or more servers.

For a particular data center defragmentation, a plan may be set for the migration such that it occurs in a plurality of phases, each extending over one or more days. For example, each phase may constitute some number of days of a week in which multiple batches of migrations occur, e.g., two batches per day. During each of these batches, large numbers of VMs may be migrated as described herein. For example, many thousands of VMs may be migrated per batch. Due to the multi-phase operation of data center defragmentation, substantially all of the VMs are available to customers during the data center defragmentation process.

Embodiments may be implemented in code and may be stored on a non-transitory storage medium having stored thereon instructions which can be used to program a system to perform the instructions. The storage medium may include, but is not limited to, any type of non-transitory storage medium suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   identifying, in a defragmentation scheduling logic of a first system of a data center, a first virtual machine (VM) of a first server of the data center to select for migration based on a cost determined according to a source algorithm;
   identifying a second server of the data center to select for receipt of the first VM based on a cost determined according to a destination algorithm, wherein the source algorithm and the destination algorithm are interdependent on each other, and the second server has available free space to receive the first VM and the available free space has been scrubbed prior to the identification of the second server;
   migrating the first VM from the first server to the second server;
   performing a scrubbing operation on the first server after migrating the first VM;
   associating the first VM with a second type of hypervisor in the second server, wherein the first VM is associated with a first type of hypervisor in the first server, the first hypervisor type heterogeneous to the second hypervisor type, wherein the second hypervisor type is an update to the first hypervisor type;
   responsive to a determination by the destination algorithm that a large contiguous space is needed responsive to presence of one or more VMs of the first server to be migrated, the one or more VMs of a size that exceeds a threshold, migrating additional VMs from the first server to another server;
   migrating a substantial plurality of VMs between servers of the data center based on cost according to the source and destination algorithms, to defragment the data center to enable greater amounts of contiguous available space for VMs subsequent to the data center defragmentation; and
   maintaining computing resources of the data center including the substantial plurality of VMs accessible to customers of the data center during the migrating.

2. The method of claim 1, wherein performing the scrubbing operation removes data fragments of a prior VM that executed on the second first server.

3. The method of claim 1, further comprising performing a scrubbing operation on all potential destination servers before identifying the second server.

4. The method of claim 1, further comprising:
   iteratively migrating each of a plurality of VMs from the first server to other servers of the data center and scrubbing the first server; and
   thereafter making the first server available for receipt of migration by the destination algorithm.

5. The method of claim 1, wherein the method comprises migrating more than 70,000 VMs within several weeks.

6. An article comprising a non-transitory computer-readable storage medium comprising instructions to:
   identify, in a defragmentation scheduling logic of a first system of a data center, a first virtual machine (VM) of a first server of the data center to select for migration based on a cost determined according to a source algorithm;
   identify a second server of the data center to select for receipt of the first VM based on a cost determined according to a destination algorithm, wherein the source algorithm and the destination algorithm are interdependent on each other, and the second server has available free space to receive the first VM and the available free space has been scrubbed prior to the identification of the second server;
   migrate the first VM from the first server to the second server;
   perform a scrubbing operation on the first server after migration of the first VM;
   associate the first VM with a second type of hypervisor in the second server, wherein the first VM is associated with a first type of hypervisor in the first server, the first hypervisor type heterogeneous to the second hypervisor type, wherein the second hypervisor type is an update to the first hypervisor type;
   responsive to a determination by the destination algorithm that a large contiguous space is needed responsive to presence of one or more VMs of the first server to be migrated, the one or more VMs of a size that exceeds a threshold, migrate additional VMs from the first server to another server; and
   migrate a substantial plurality of VMs between servers of the data center based on cost according to the source and destination algorithms, to defragment the data center to enable greater amounts of contiguous available space for VMs subsequent to the data center defragmentation, wherein computing resources of the data center including the substantial plurality of VMs are accessible to customers of the data center during the migrating.

7. The article of claim 6, wherein the scrubbing operation removes data fragments of a prior VM that executed on the second first server.

8. A data center comprising:
a plurality of servers each to execute a hypervisor on which one or more virtual machines (VMs) operate; and
a data center management system configured to:
identify a first VM of a first server to select for migration based on a cost determined according to a source algorithm;
identify a second server to select for receipt of the first VM based on a cost determined according to a destination algorithm, wherein the source algorithm and the destination algorithm are interdependent on each other and the second server has available free space to receive the first VM and the available free space has been scrubbed prior to the identification of the second server;
migrate the first VM from the first server to the second server;
perform a scrubbing operation on the first server after migration of the first VM;
associate the first VM with a second type of hypervisor in the second server, wherein the first VM is associated with a first type of hypervisor in the first server, the first hypervisor type heterogeneous to the second hypervisor type, wherein the second hypervisor type is an update to the first hypervisor type;
responsive to a determination by the destination algorithm that a large contiguous space is needed responsive to presence of one or more VMs of the first server to be migrated, the one or more VMs of a size that exceeds a threshold, migrate additional VMs from the first server to another server; and
migrate a substantial plurality of VMs between servers of the data center based on cost according to the source and destination algorithms, to defragment the data center to enable greater amounts of contiguous available space for VMs subsequent to the data center defragmentation.

9. The data center of claim 8, wherein the substantial plurality of VMs are accessible to customers of the data center during the migration.

* * * * *